Figure 1:
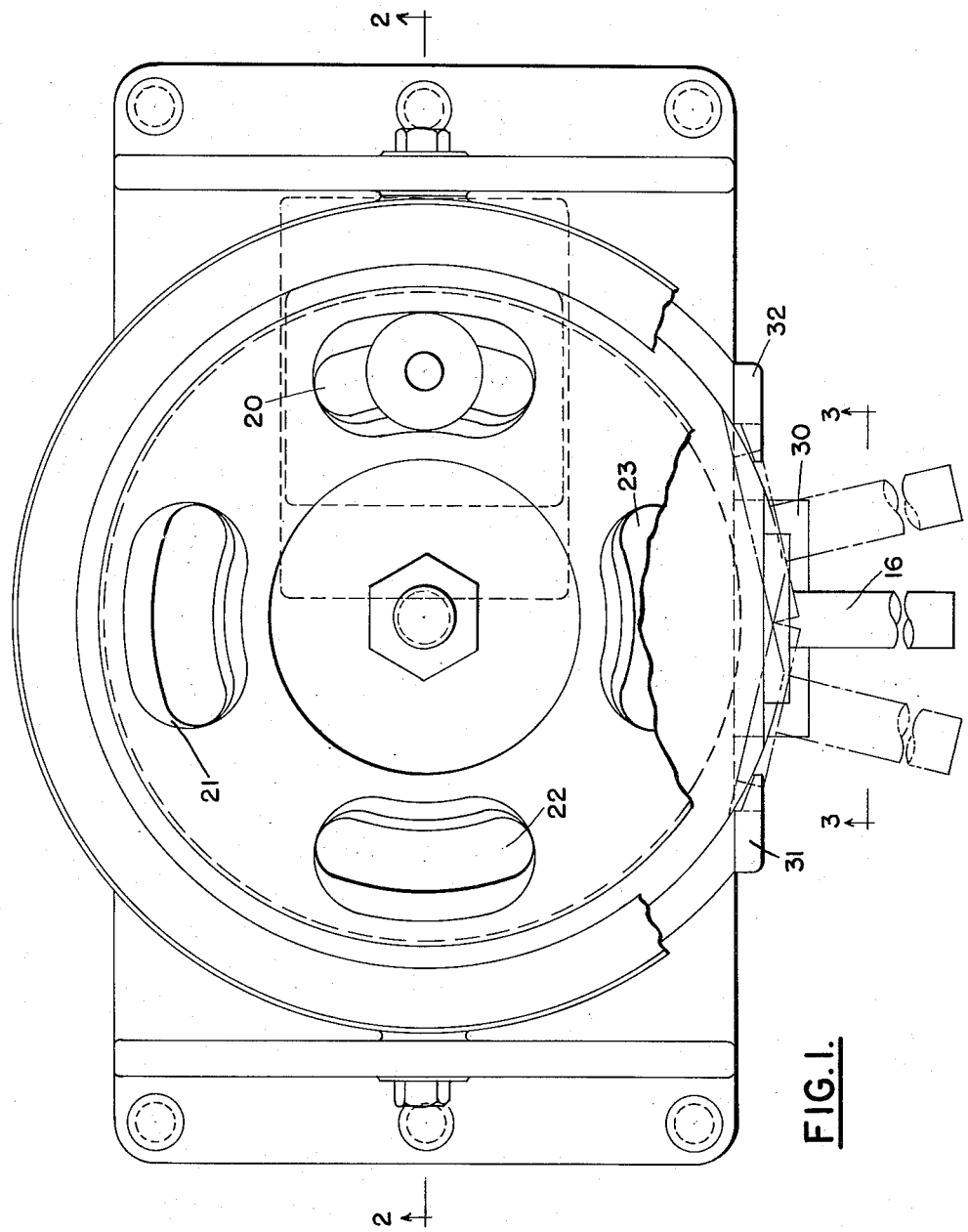

Aug. 22, 1961     C W. MUSSER     2,996,849
VENTURI MACHINING APPARATUS

Filed Feb. 3, 1960     2 Sheets-Sheet 1

FIG.I.

INVENTOR.
C WALTON MUSSER

BY *S. J. Rotondi, A. J. Dupont*
*& S. Dubroff*

ATTORNEYS:

2,996,849
VENTURI MACHINING APPARATUS
C Walton Musser, Beverly, Mass., assignor to the United States of America as represented by the Secretary of the Army
Filed Feb. 3, 1960, Ser. No. 6,577
1 Claim. (Cl. 51—96)
(Granted under Title 35, U.S. Code (1952), sec. 266)

The invention described herein may be manufactured and used by or for the Government for governmental purposes without the payment to me of any royalty thereon.

This invention relates to the manufacture of venturis for recoilless rifles. It has for its principal object the provision of an improved mechanism for manufacture whereby the contour of a venturi is made smoother and less subject to erosion than that of the venturis heretofore available.

On the entrance side, a venturi is essentially a simple radius, the circumference of which is tangent to a straight line in the expansion part of the venturi. This shape cannot be accurately produced by means of a simple conical cutter for one side and a simple radius cutter for the other side. This is so because a ridge is left where the two cutters overlap. It is customary to remove this ridge by means of hand tools. This leaves a flat or a break in the curvature at this portion of the venturi.

Examination of many venturis that have been fired show that any variation in their smoothness of contour increases erosion and unbalances the recoil of the rifle. It is found that venturis which appear to have identical throat areas produce widely different recoils. It is also found that switching venturis in recoilless rifles produces within these rifles the recoil that is characteristic of the venturi. From this it follows that recoil is a function of the venturi and not of the rifle. It is therefore highly desirable that the contour of the venturi be accurate and smooth.

In accordance with the present invention, this result is achieved by the provision of a specially formed tool which is rotated within the venturi while the venturi is subjected to a combined tilting and rotary motion to produce the desired contour.

The invention will be better understood from the following description when considered in connection with the accompanying drawings and its scope is indicated by the appended claims.

Figure 2:
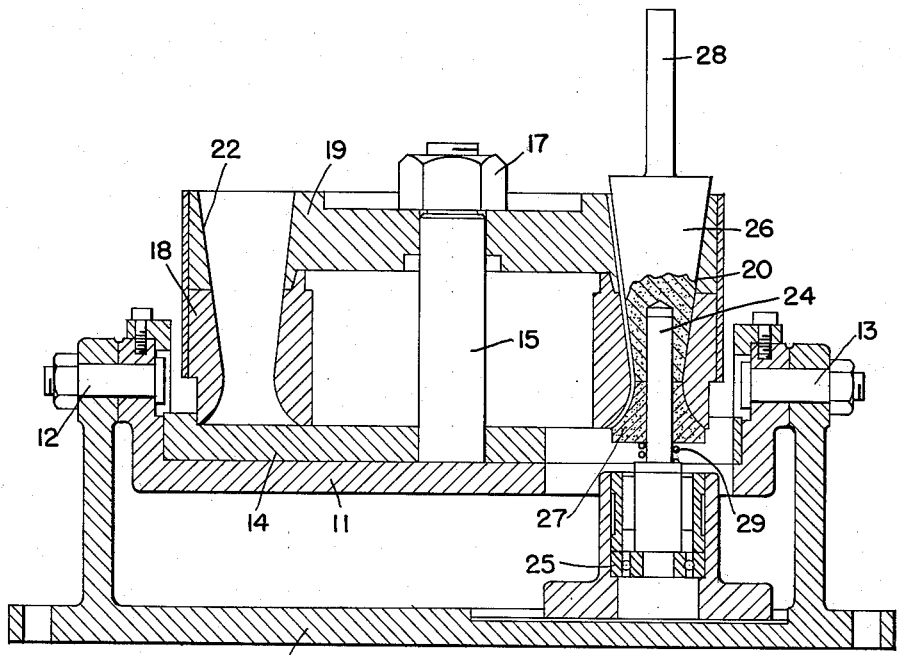
Figure 3:
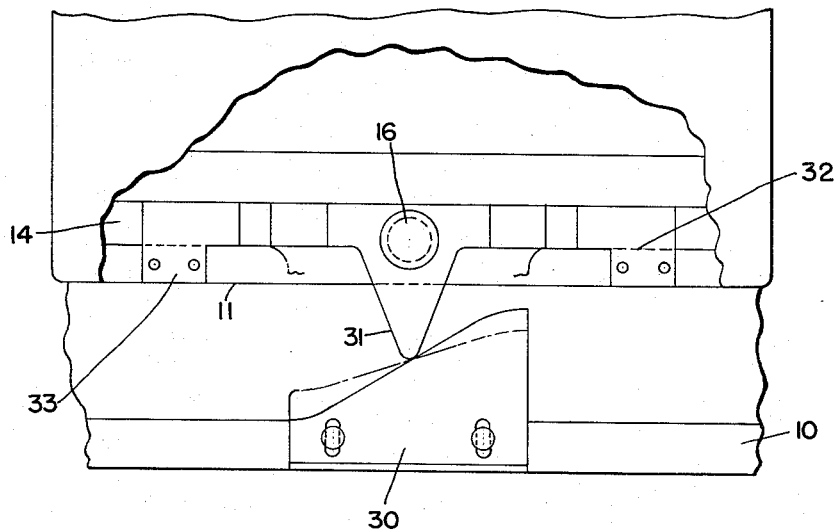

Referring to the drawings:

FIG. 1 is a top view of the mechanism by which the improved venturi is produced, the member in which the venturis are formed being shown as mounted on this mechanism, FIG. 2 is a section taken on the line 2—2 of FIG. 1, and FIG. 3 is a partial section taken on the line 3—3 of FIG. 1.

The mechanism shown by these figures includes a base 10 to which a table 11 is pivoted by pins 12 and 13. Resting on the table 11 is a flat work holder or member 14 which has a bolt 15 welded to it and is rotatable on the table 11 by means of a handle 16 (see FIG. 1). Clamped to the rotatable member 14 by a nut 17 are members 18—19 in which venturis 20 to 23 have been rough machined.

A shaft 24 is supported in a roller bearing 25 which is fixed to the base 10. Mounted on the shaft 24 is a fine toothed two-element file or an abrasive tool 26—27. The tool element 26 has a drive shaft 28, and a spring 29 is interposed between the element 27 and an offset in the shaft 24 for urging the element 27 toward the element 26. The ends of the tools 26—27 where they are in contact with each other can be made to rotate together with shaft 24 in any well known manner to prevent leaving an unfinished machining line where the pieces are in contact.

In the finishing of the rough machined venturi, the oppositely tapered cone cutter tool 26—27 is rotated about the shaft 28 by a drill press or other suitable machine tool. The member 14 is then rotated around an axis extending through the center of the bolt 15. As the tool rotates in an arcuate venturi of a workpiece having at least two such venturis therein and clamped on the member 14, the member 14 is being manually rotated. The work is subjected to a tilting action when needed which tilting is determined by the surface of cam-shaped member 30 and the cam follower support 31 for the tilting table 11 (see FIG. 3). This rotational movement of the member 14 in relation to the tool 26—27 is limited by stops 33 and 32 to an arc commensurate with the length of the venturi being finished. To produce the finest finish it is desirable to do one side as well as one end of the venturi at a time. Hence, the diameter of the tools 26—27 are made somewhat smaller than the rough finished venturi openings and the table on which base 10 is mounted is moved to the position desired to produce the proper size.

In setting up the members 18 and 19 for the finishing of the venturi 20, the spring 29 and tool element 27 are placed in their illustrated positions and the members 18 and 19 are clamped to the member 14 with the tool element 27 extending into the venturi as shown. Then the tool is rotated by any suitable means and the base 10 is adjusted to where an appropriate cut is being taken. The handle 16 is utilized to move the tool between the opposite ends of the venturi. The degree of tilt is determined by the position of cam follower support 31 on the cam member 30. The form of the tool then leaves the surface of the venturi with the desired contour. The width of the venturi is determined by the tool 26—27 diameter and the table motion introduced between cutting one side and the other.

This tool will then produce an accurately shaped venturi opening which is completely reproducible. It also produces the end contour or expansion angle of the venturi that is necessary for an efficient nozzle, and, the difference in angle between the two ends necessary to cancel rotational recoil in a rifled weapon.

As shown in FIG. 3 stops 32 and 33 are each secured to the table 11 to limit rotation of the work holder 14 to some amount less that 180° when there are two or more venturis. The cam 30 is secured to base 10 and is for use chiefly where the ends of each venturi do not have the same slope, as is well known in the art as mentioned in the preceding paragraph for reduction in rotational recoil due to rifling in a gun barrel. As used herein the term "cone cutter" includes both an abrasive and an edged cutter. Spring 29 cooperates with a shoulder on shaft 24 and with the lower one of the oppositely tapered cone cutters to hold this cutter in contact with the work.

I claim:

Apparatus by means of which the surface of an arcuate venturi opening in a breech closure of a recoilless rifle may be finished, said apparatus comprising a rotatable work holder, means for clamping a workpiece thereto, a pivotally supported table in and on which rotation of said work holder is guided, a handle projecting from said work holder and by means of which a workpiece may be manually rotated with respect to said table, a base on which said table is mounted, stops on said table for limiting rotation of said work holder to an amount less than 180°; an upstanding rotatable shaft on said base, a pair of oppositely tapered cone cutters on said upstanding shaft for rotation therewith, a bearing in which said shaft is rotatable, a spring cooperating with a shoulder on said shaft and with an adjacent one of said cone cutters, means for driving said cone cutters through that one of said pair which is opposite said upstanding shaft and its bearing, and means whereby said workpiece, its rotatable work holder, and supporting table may be tilted simultaneously with at least some of said rotation, said last mentioned means including a cam fixed to said base, and a cam follower support by which said work holder and its table may be tilted with respect to said base as said cutters operate at an end of a venturi.

References Cited in the file of this patent

UNITED STATES PATENTS

| | | |
|---|---|---|
| 1,851,004 | Donaldson | Mar. 29, 1932 |
| 2,202,587 | Kitchen | May 28, 1940 |